United States Patent [19]
Bolton

[11] Patent Number: 5,699,118
[45] Date of Patent: Dec. 16, 1997

[54] QUANTIZER HAVING A LOW PROBABILITY OF SATURATION

[75] Inventor: Martin Bolton, Tullins, France

[73] Assignee: SGS-Thomson Microelectronics S.A., Saint Genis, France

[21] Appl. No.: 412,374

[22] Filed: Mar. 29, 1995

[30] Foreign Application Priority Data

Mar. 30, 1994 [FR] France .................................. 94 04145

[51] Int. Cl.$^6$ .................................................. H04N 7/30
[52] U.S. Cl. ..................................... 348/405; 341/200
[58] Field of Search ................... 348/405, 419; 341/200; 382/251, 243; 375/245

[56] References Cited

U.S. PATENT DOCUMENTS

| | | | |
|---|---|---|---|
| 4,386,237 | 5/1983 | Virupaksha et al. | 179/15.55 |
| 5,016,010 | 5/1991 | Sugiyama | 341/67 |
| 5,072,295 | 12/1991 | Murakami et al. | 348/405 |
| 5,150,208 | 9/1992 | Otaka et al. | 358/133 |
| 5,184,229 | 2/1993 | Sainto et al. | 358/427 |
| 5,245,427 | 9/1993 | Kunihiro | 358/133 |
| 5,301,242 | 4/1994 | Gonzales et al. | 342/56 |
| 5,434,623 | 7/1995 | Coleman et al. | 348/405 |

FOREIGN PATENT DOCUMENTS 2125255  2/1984  United Kingdom ............. H04L 5/00

OTHER PUBLICATIONS

IEEE Transactions On Circuits And Systems For Video Technology, vol. 1, No. 4, Dec. 1991, New York US pp. 374–378, C.A. Gonzales et al., "Motion Video Adaptive Quantization in a Transform Domain:".

R. Plompen, "Motion Video Coding For Visual Telephony" 1989, PTT Research Neher Laboratories, NL.

IEEE Transactions On Circuits And Systems For Video Technology vol. 2, No. 2, Jun. 1992, New York US pp. 111–112, P.A. Ruetz et al., "A High-Performance Full-Motion Video Compression Chip Set".

*Primary Examiner*—Amelia Au
*Attorney, Agent, or Firm*—Wolf, Greenfield & Sacks, P.C.; James H. Morris

[57] ABSTRACT

A quantizer that divides each digital word of a series of sequences by a quantification coefficient which may vary from one sequence to the other. The quantizer includes a delay circuit that receives the words to be divided and delays the words by one sequence; a divider that receives the output of the delay circuit; another circuit that provides, for each sequence, the maximum value of the ratio between each word and a limit value that can be provided by the quantizer; a comparator that receives the maximum value of the ratio and the quantification coefficient; a switch, cooperating with the comparator, that provides to the divider a division coefficient equal either to the quantification coefficient if the quantification coefficient is higher than the maximum value of the ratio, or alternatively the maximum value of the ratio.

46 Claims, 3 Drawing Sheets

QUANTIZER HAVING A LOW PROBABILITY OF SATURATION

BACKGROUND OF THE INVENTION

1. Field of the Invention

The present invention relates to moving picture compression circuits according to H.261 and MPEG standards, and more particularly to a quantizer which may be used in such compression circuits.

2. Discussion of the Related Art

FIG. 1 partially represents a compression system according to H.261 and MPEG standards. This system includes a discrete cosine transform (DCT) circuit 10 which receives data corresponding to picture squares, generally 16×16-pixel squares, to be compressed. Generally, the pixels of a picture square are arranged in so-called macroblocks. Each macroblock includes four luminance blocks of 8×8 pixels and two or four chrominance blocks of 8×8 pixels. The DCT circuit 10 processes each 8×8-pixel block and provides a corresponding 8×8 matrix of signed coefficients $C_{ij}$. Coefficients $C_{ij}$ are 12-bit words.

The output of DCT circuit 10 is provided to a quantizer 12 which in particular multiplies each coefficient $C_{ij}$ by 8 (i.e., a 3-bit left-shift) and divides the coefficient by a quantification coefficient Q and by a weighing coefficient $W_{ij}$. The quantification coefficient Q, used in H.261 and MPEG standards, can vary from one block to the other and can be freely chosen by the designer of a compression system. The weighing coefficients $W_{ij}$, normally used in MPEG standards only, may be different for each coefficient $C_{ij}$ of a block and are provided by a table 14 that is used for each block of a same picture. MPEG standards recommend the use of two assigned tables, one table assigned to so-called intra pictures, and the other table to the non-intra pictures.

The function of the quantizer 12 is to cancel the coefficients $C_{ij}$ that have a small value. Coefficients $C_{ij}$ processed by the quantizer 12 are 9-bit data (MPEG standard) or 8-bit data (H.261 standard), which are provided to a circuit 16. Circuit 16 performs zigzag scanning (ZZ), a run/level coding (RLC) and a variable length coding (VLC). The quantification coefficients Q, normally known during the decoding phase of the corresponding macroblocks, are inserted, during the VLC encoding, in headers preceding the compressed macroblocks.

FIG. 2 represents an exemplary structure of a conventional quantizer 12. At 18, coefficients $C_{ij}$ are left-shifted by 3 bits (i.e., are multiplied by 8) before being provided as 15-bit words to a divider 20. The dividing coefficient K of divider 20 is provided by a multiplier 22 which receives the 5-bit quantification coefficient Q, and the 8-bit weighing coefficient $W_{ij}$. The minimum value of coefficients Q and $W_{ij}$ is typically 1, so that the result of the division by K theoretically comprises 15 bits. In practice, it has been noticed that 10 bits are usually sufficient.

As mentioned above, the output of the quantizer 12 is either a 9-bit or 8-bit output. There is a risk for divider 20 to provide a result of 10 significant bits if coefficients Q and $W_{ij}$ are low. To be able to use the divider output on 9 or 8 bits, there is provided, at the output of divider 20, a saturation circuit 24 that limits the output of divider 20 to ±255, or ±127 if the 10th bit of the divider becomes significant.

Saturation does not cause a visible defect on the screen if it briefly occurs from time to time. This is generally the case when the quantification coefficient Q is suitably selected. However, the quantification coefficient is predetermined for each macroblock. The predetermination, however, does not take into account that some of coefficients $C_{ij}$ to be processed might be saturated. In this case, a repetitive saturation causing visible effects on the screen may occur from time to time.

SUMMARY OF THE INVENTION

An object of the present invention is to provide a quantizer having a low probability for the processed coefficients to saturate.

To achieve this and other objects, one illustrative embodiment of the present invention checks whether saturation is likely to occur with a selected quantification coefficient. When saturation is likely to occur, another quantification coefficient is used that is sufficiently high to avoid saturation. A quantizer is provided for dividing each digital word of a series of sequences by a quantification coefficient varying from one sequence to the other. The quantizer includes a delay circuit for delaying by one sequence the words to be divided; a divider receiving the output of the delay circuit; a circuit for providing, at each sequence, the maximum value of the ratio between each word and a limit value that can be provided by the quantizer; and a circuit for providing to the divider a division coefficient equal to the greater of the quantification coefficient, or the maximum value of the ratio.

According to an embodiment of the invention, the words to be divided are provided by a circuit for multiplying by a constant value and for dividing by a variable weighing coefficient.

According to another embodiment of the invention, the quantizer includes a circuit for providing a maximum value of the words at each predetermined sub-sequence of a sequence, and a circuit for indicating that a subsequence includes only null words if the maximum value of the words is lower than the dividing coefficient provided to the divider.

According to a further embodiment of the present invention, the circuit for providing the maximum value of the ratio includes a saturation circuit to limit the maximum value of the ratio to the maximum value of a quantification coefficient.

According to another embodiment of the present invention, the sub-sequences are luminance and chrominance blocks of a picture, and the sequences are macroblocks grouping luminance and chrominance blocks corresponding to picture squares.

The foregoing and other objects, features, aspects and advantages of the invention will become apparent from the following detailed description of the present invention when taken in conjunction with the accompanying drawings.

DETAILED DESCRIPTION

One illustrative embodiment of the present invention provides a quantizer in which the coefficients of a macroblock are received as digital words in a series of sequences, and stored before being divided by a predetermined quantification coefficient. While coefficients are stored, these coefficients are checked to determine whether they might be saturated when they are divided by the determined quantification coefficient. If at least one of the coefficients has a risk of being saturated, the stored coefficients are divided by a readjusted quantification coefficient.

Figure 3:
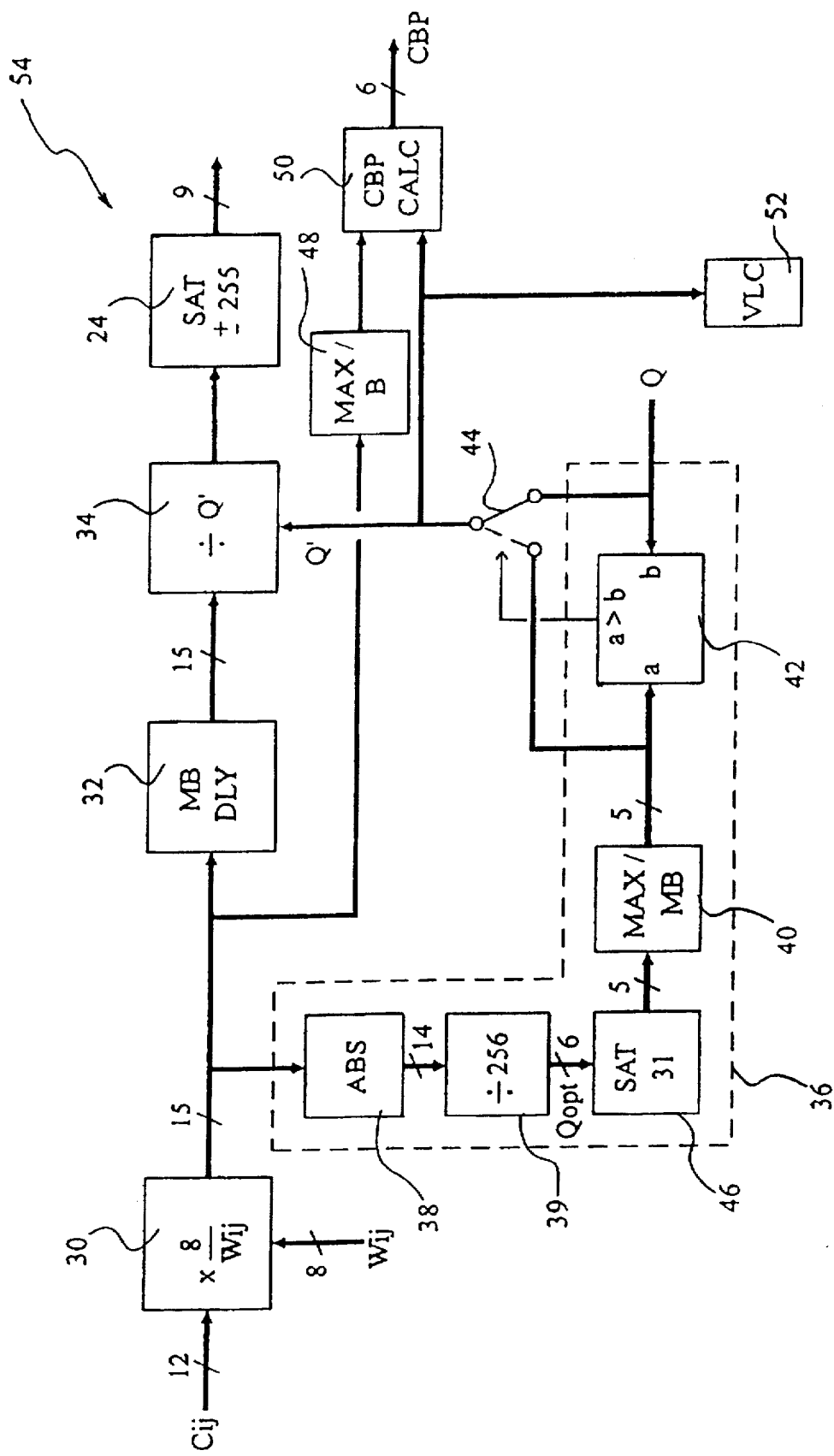
FIG. 3 represents an embodiment of the quantizer according to the invention.

FIG. 3 is a block diagram of a quantizer 54 according to the present invention wherein the operation of multiplying the coefficients Cij, provided by a circuit such as the DCT circuit 10 (FIG. 1), by 8 and dividing the coefficients Cij by the weighing coefficient Wij and is combined, and the operation of dividing the coefficients Cij by the quantification coefficient Q is separately provided. In circuit 30, the coefficients Cij are multiplied by 8 and divided by the weighing coefficients Wij (for the MPEG standards). For H.261 standards, circuit 30 multiplies by 8 only.

Figure 1:
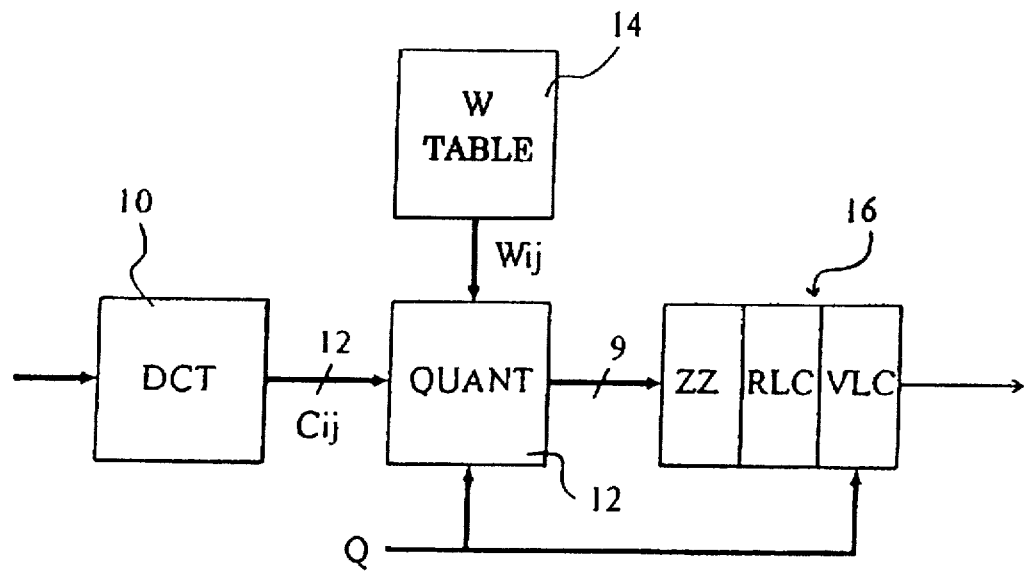
FIG. 1, above described, partially represents a picture compression system according to H.261 and MPEG standards.
Figure 2:
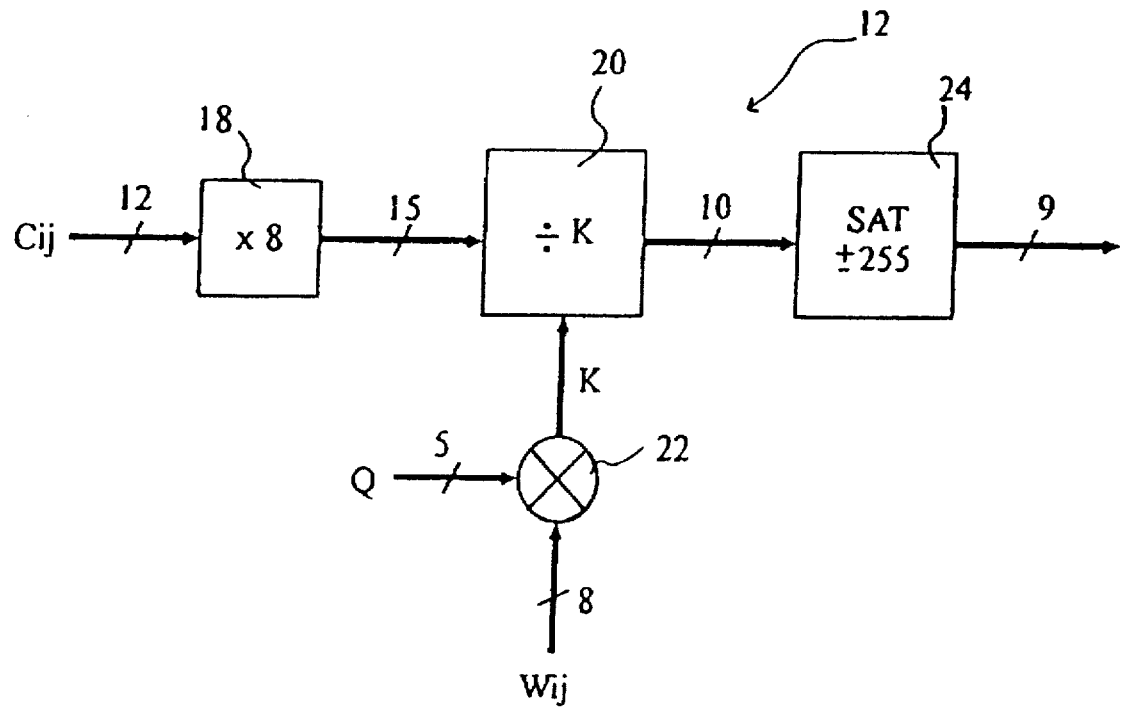
FIG. 2, above described, represents a conventional structure of a quantizer.
Figure 4:
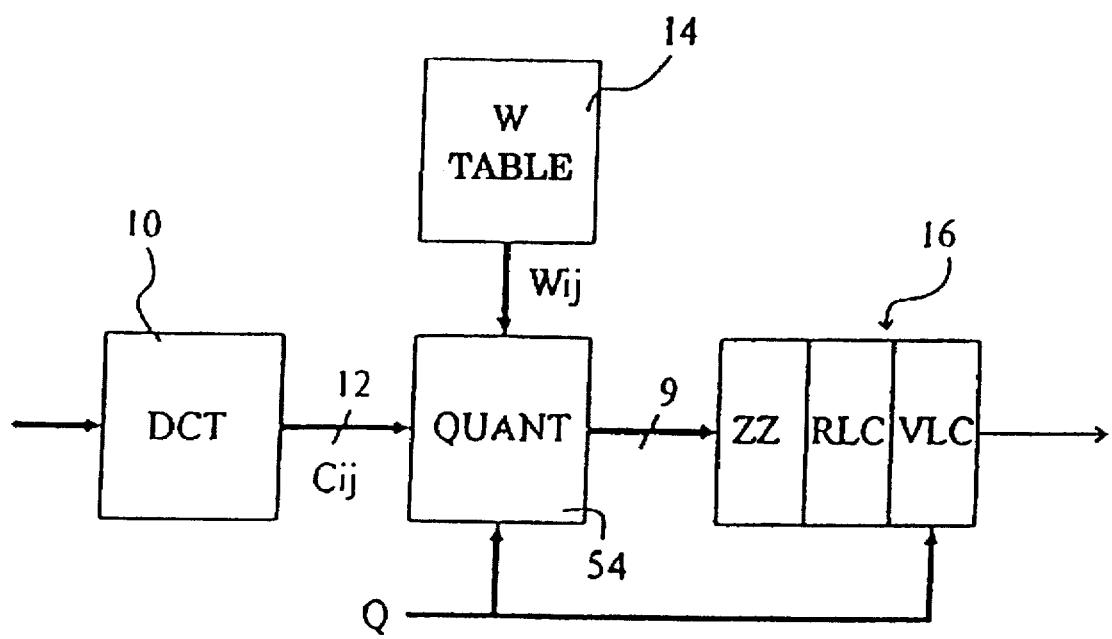
FIG. 4 shows an embodiment of the invention in which the quantizer of FIG. 3 is included in a circuit such as that shown in FIG. 1.

FIG. 4 shows an embodiment of the invention in which the quantizer of FIG. 3 is included in a circuit such as that shown in FIG. 1.

In a delay circuit 32, for example a memory, the values provided by circuit 30 are delayed by one macroblock before incoming to a divider 34 whose output constitutes the quantizer output. The division factor Q' of divider 34 is either the quantification coefficient Q, or a higher coefficient if a saturation risk has been detected.

A saturation risk is detected by a circuit 36. In circuit 36, a module 38 for calculating the absolute value receives the output of circuit 30 (the coefficients Cij provided by the DCT circuit are signed numbers, represented by digital words). The absolute value provided by the 14-bit circuit 38 is shifted to the right by 8 bits at 39, which amounts to a division by 256, which corresponds to the maximum signed value that can be provided on the 9 bits of the output of the quantizer 54. The result of this division, six bits, is the optimum value Qopt of the quantification coefficient, that is the minimum value of the quantification coefficient Q' so that the selected coefficient Cij is not saturated when it is output from the quantizer 54. Each of these optimum values is provided to a unit 40 that stores, for each macroblock, the highest optimum value.

When the last coefficient of a macroblock is stored in the delay circuit 32, unit 40 has stored the highest of the optimum values. If this highest optimum value is higher than the quantification coefficient Q, at least one stored macroblock coefficient would be effectively saturated. To avoid this, a comparator 42 compares the quantification coefficient Q with the optimum value stored by unit 40 and controls a switch 44 to provide, as a division coefficient to divider 34, either the quantification coefficient Q if the highest optimum value is lower than the quantification coefficient, or this highest optimum value otherwise. This division coefficient is then applied by divider 34 to all of the coefficients of the macroblock that have been stored in the delay circuit 32. For this purpose, for example, the output of comparator 42 is locked at each macroblock by a macroblock synchronization signal existing in every compression circuit.

Thus, theoretically, the used quantification coefficient Q' is always higher than or equal to a saturation limit. However, the optimum coefficients Qopt are 6-bit coefficients whereas the quantification coefficients are 5-bit coefficients whose maximum value may be, for example 31. Thus, there is provided, at the input of the unit 40 storing the maximum value, a saturation circuit 46 to limit the optimum coefficients Qopt to the maximum value 31. When circuit 46 starts to operate, divider 34 provides at least a 10-bit result. Accordingly, the saturation circuit 24 is normally provided at the output of divider 34.

The quantizer of FIG. 3 only saturates in the very rare cases when the maximum quantification coefficient (31) is not high enough.

As mentioned above, the quantification coefficients used for each macroblock may be inserted in headers during the variable length coding VLC. With a quantizer according to one embodiment of the invention, instead of providing the initial quantification coefficient Q to the VLC circuit as shown in FIG. 1, the quantification coefficient Q' is provided to the VLC circuit 52, as shown in FIG. 3.

The insertion of a macroblock delay circuit 32 in the processing of the data to be compressed is not a detriment since such a delay is normally needed. Indeed, a header preceding a macroblock contains a macroblock pattern parameter CBP which marks the null blocks of the macroblock. In the example where a macroblock contains four luminance blocks and two chrominance blocks, parameter CBP includes 6 bits, each of which is associated with one of the six blocks of the macroblock and indicates whether the respective block is null or not. To calculate this parameter, a delay of one macroblock is introduced so that it is possible to check each coefficient of the macroblock and to transmit parameter CBP in the header preceding the compressed data of the macroblock.

The delay circuit 32 is advantageously used to calculate the parameter CBP. For this purpose, the coefficients provided to the delay circuit 32 are also provided to a unit 48 that stores the highest value for each block. A calculation circuit 50 receives from unit 48 the maximum coefficient of each block and the effective quantification coefficient Q' Each maximum value provided by unit 48 is compared by the calculation circuit 50 with the quantification coefficient Q'. If the maximum value is lower than the quantification coefficient Q', the corresponding bit of the parameter CBP is set to 0 to indicate that the corresponding block is null. The division at 34 of a coefficient by a higher coefficient Q' may also provide a null result. Otherwise, the bit of parameter CBP is set to 1 to indicate that the corresponding bit is non-null.

The fabrication of the various circuits and units described above can be easily carried out by those skilled in the art. For example, a unit to store a maximum value may include a register and a comparator. In this example, the comparator receives the content of the register and incoming data. If an incoming data is higher than the register's content, it may be stored in the register. The register is periodically reset by a synchronization signal of blocks or macroblocks normally present in each compression circuit.

Embodiments of this invention have been described for H.261 and MPEG standards. However, the invention is not limited to these standards, and may be advantageously applied to other standards as well. Furthermore, although an embodiment has been described with coefficients and words with exemplary numbers of bits, and constants such as the saturation size, the invention is not limited to these exemplary numbers of bits, or constants.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A quantizer for dividing each digital word in a series of digital word sequences by a calculated quantification coefficient to generate a series of quantized word sequences, each digital word sequence being associated with an initial quantification coefficient, the quantizer including:
   a delay circuit having an input that receives the series of digital word sequences and an output that provides the series of digital word sequences delayed by one digital word sequence;
   a divider having a dividend input coupled to the output of the delay circuit, a divisor input, and a quotient output that provides the series of quantized word sequences;
   a ratio circuit having an input that receives the series of digital word sequences and an output that provides for each sequence a maximum value of a ratio between each digital word in the sequence and a limit value; and
   a coefficient circuit having an input coupled to the output of the ratio circuit and an output that provides the calculated quantification coefficient to the divisor input of the divider, the calculated quantification coefficient for each digital word sequence being a greater of the initial quantification coefficient associated with the sequence and the maximum value of the ratio for the sequence.

2. The quantizer of claim 1, further including a multiplier having an input that receives a series of input word sequences and an output that provides the series of digital word sequences to the delay circuit and the ratio circuit, the multiplier multiplying each of the input words of the input word sequences by a constant value divided by a variable weighing coefficient to generate the series of digital word sequences.

3. The quantizer of claim 1, wherein each of the series of digital word sequences includes a plurality of subsequences that each includes a plurality of digital words, and wherein the quantizer further includes:
   a maximum value circuit having an input that receives the series of digital word sequences and an output that provides for each of the plurality of subsequences a maximum value of the digital words in the subsequence; and
   a null circuit having a first input coupled to the output of the maximum value circuit, a second input coupled to the output of the ratio circuit, and an output indicating that a sub-sequence includes only null words when the maximum value of the digital words of the sub-sequence is lower than the calculated coefficient for the sequence that includes the subsequence.

4. The quantizer of claim 1, wherein the ratio circuit includes a saturation circuit that limits the maximum value of the ratio for each digital word sequence to a maximum quantification coefficient constant.

5. The quantizer of claim 3, wherein each of the plurality of subsequences is one of luminance and chrominance blocks of a picture, and wherein the digital word sequences are macroblocks grouping luminance and chrominance blocks corresponding to picture squares.

6. The quantizer of claim 4, wherein the ratio circuit further includes:
   an absolute value circuit that receives the series of digital word sequences and generates an absolute value for each digital word of the series of digital word sequences; and
   a second divider, coupled to the absolute value circuit and the ratio circuit, that divides the absolute value of each digital word in each digital word sequence by the limit value to generate the ratio for each digital word.

7. The quantizer of claim 1, further including an output saturation circuit, coupled to the quotient output of the divider, that limits each word in the series of quantized word sequences from exceeding a maximum output constant.

8. The quantizer of claim 1, further including a compression circuit having an input coupled to the output of the ratio circuit to receive the calculated coefficient for each digital word sequence, the compression circuit providing compressed data and a header as an output, the compression circuit providing the calculated coefficient as the header.

9. A quantizer for dividing each digital word in a received sequence of digital words by a division coefficient to produce a quantized output word sequence, the received sequence of digital words having an associated quantification coefficient, each of the digital words having a value, the quantizer comprising:
   a storage element having an output and an input that receives the received sequence of digital words;
   a coefficient generating circuit having a first input that receives the received sequence of digital words, a second input that receives the quantification coefficient associated with the received sequence of digital words, and an output that provides the division coefficient, the coefficient generating circuit generating the division coefficient to be the larger of:
     the quantification coefficient associated with the received sequence of digital words; and
     a largest of the values of the digital words in the received sequence divided by a division constant that represents a maximum desired value for an output of the quantizer; and
   a divider having a dividend input coupled to the output of the storage element, a divisor input coupled to the output of the coefficient generating circuit, and an output that provides the quantized output word sequence.

10. The quantizer of claim 9, further including a multiplier circuit having an input that receives an input sequence of digital words and an output that provides the received sequence to the input of the storage element and the input of the coefficient generating circuit, the multiplier multiplying each of the input words of the input sequence by a multiplication constant to generate the received sequence.

11. The quantizer of claim 10, wherein the multiplication constant is equal to a predetermined value when the received sequence represents a video signal for which no weighing coefficient is provided, and wherein the multiplication constant is equal to the predetermined value divided by a weighing coefficient when the received sequence represents a video signal for which the weighing coefficient is provided.

12. The quantizer of claim 9, wherein the received sequence includes a plurality of subsequences of digital words, and wherein the quantizer further includes:
   a maximum value circuit having an input that receives the received sequence and an output that provides for each of the plurality of subsequences a maximum value of the digital words in the received subsequence; and
   a null circuit having an input coupled to the output of the maximum value circuit, and an output indicating for each of the plurality of subsequences whether the maximum value of the digital words in the subsequence is lower than the calculated coefficient for the received sequence that includes the subsequence.

13. The quantizer of claim 9, wherein the coefficient generating circuit further includes:

a saturation risk circuit having an input that receives the received sequence, and an output that is equal to a largest of ratios of each of the digital words in the received sequence divided by a limit value representing a maximum value desired to be provided by the quantizer;

a comparator having a first input coupled to the output of the saturation risk circuit, a second input that receives the quantification coefficient associated with the received sequence, and an output that is asserted when the output of the saturation risk circuit is greater than the quantification coefficient associated with the received sequence; and a switch having a selection input coupled to the output of the comparator, a first data input coupled to the output of the saturation risk circuit, a second data input that receives the quantification coefficient associated with the received sequence, and an output coupled to the divisor input of the first divider, the switch selecting the output of the saturation risk circuit when the selection input of the switch is not asserted, and the quantification coefficient associated with the received sequence when the selection input of the switch is asserted.

14. The quantizer of claim 13, wherein the saturation risk circuit further includes:

an absolute value circuit having an input that receives the received sequence, and an output that provides an absolute value of each digital word in the received sequence;

a second divider having a dividend input coupled to the output of the absolute value circuit, a divisor input coupled to a division constant, and an output that provides, for each digital word in the received sequence, a ratio equal to the absolute value of the digital word divided by a division constant; and a maximum value circuit having an input coupled to the output of the second divider and an output indicative of a maximum ratio received from the second divider.

15. The quantizer of claim 9, further including an output saturation circuit having an input coupled to the output of the divider and an output that limits the quantized output word sequence to a maximum output value.

16. The quantizer of claim 9, further including a compression circuit having an input coupled to the output of the coefficient generating circuit to receive the division coefficient, the compression circuit providing a header and compressed data as an output, the compression circuit providing the calculated coefficient as the header.

17. A quantizer for dividing each digital word in a received sequence of digital words by a division coefficient to produce a quantized output word sequence, the received sequence of digital words having an associated quantification coefficient, each of the digital words having a value, the quantizer comprising:

a storage element having an output and an input that receives the received sequence of digital words;

means for generating the division coefficient to equal the larger of;

a largest absolute value of the digital words in the received sequence of digital words divided by a division constant; and the quantification coefficient associated with the received sequence of digital words; and a divider having a dividend input coupled to the output of the storage element, a divisor input that receives the division coefficient from the means for generating, and an output that provides the quantized output word sequence.

18. The quantizer of claim 17, further including a multiplier circuit having an input that receives an input sequence of digital words and an output that provides the received sequence to the input of the storage element and the input of the coefficient generating circuit, the multiplier multiplying each of the input words of the input sequence by a multiplication constant to generate the received sequence.

19. The quantizer of claim 18, wherein the multiplication constant is equal to a predetermined value when the input sequence of digital words represents a video signal for which no weighing coefficient is provided, and wherein the multiplication constant is equal to the predetermined value divided by a weighing coefficient when the input sequence of digital words represents a video signal for which the weighing coefficient is provided.

20. The quantizer of claim 17, wherein the received sequence includes a plurality of subsequences of digital words, and wherein the quantizer further includes:

a maximum value circuit having an input that receives the received sequence and an output that provides for each of the plurality of subsequences a maximum value of the digital words in the subsequence; and a null circuit having an input coupled to the output of the maximum value circuit, and an output indicating for each of the plurality of subsequences whether the maximum value of the digital words in the subsequence is lower than the calculated coefficient for the received sequence that includes the subsequence.

21. The quantizer of claim 17, further including an output saturation circuit having an input coupled to the output of the divider and an output that limits the quantized output word sequence to a maximum output value.

22. The quantizer of claim 17, further including a compression circuit having an input coupled to the output of the coefficient generating circuit to receive the calculated coefficient, the compression circuit providing a header and compressed data as an output, and wherein the compression circuit provides as the header the calculated coefficient.

23. A method for dividing each digital word in a series of received word sequences by a division coefficient to produce a series of quantized word sequences, each of the quantized word sequences including a plurality of output words each having a value that is no greater than a maximum value, the series of received word sequence being associated with a corresponding series of associated quantification coefficients, a quantification coefficient being associated with each received word sequence, the method including the steps of:

A. determining whether each one of the sequences is of a first or second type, the first type of sequence including at least one digital word that would result in a quantized word having a value exceeding the maximum value when divided by the quantification coefficient associated with the sequence, the second type of sequence including no digital word that would result in a quantized word having a value exceeding the maximum value when divided by the quantification coefficient associated with the sequence;

B. dividing each digital word in each one of the received word sequences that is of the first type by the quantification coefficient associated with the one of the received word sequences; and C. dividing each digital word in each one of the received word sequences that is of the second type by the maximum value, to produce the series of quantized word sequences.

24. The method of claim 23, further including a step of, prior to step A, multiplying each digital word in each one of the sequences by a multiplication constant that is equal to a predetermined value when the one of the sequences represents a video signal for which no weighing coefficient is provided, and that is equal to the predetermined value divided by a weighing coefficient when the one of the sequences represents a video signal for which the weighing coefficient is provided.

25. The method of claim 23, wherein step A further includes steps of:
   determining a largest ratio of each of the digital words in the one of the sequences divided by a limit value determined based upon the maximum value; and
   comparing the largest ratio with the quantification coefficient associated with the one of the sequences, to determine whether dividing any of the digital words in the one of the sequences by its associated quantification coefficient would result in a quantized word having a value exceeding the maximum value.

26. The method of claim 25, wherein the step of determining a largest ratio further includes steps of:
   determining an absolute value for each digital word in the one of the sequences.
   dividing each absolute value by a division constant to generate a ratio for each digital word; and
   selecting a maximum among the ratios.

27. A method for dividing each digital word in a received sequence of digital words by a division coefficient to produce a quantized output word sequence that includes a plurality of output words each having a value that is no greater than a maximum value, the received sequence of digital words having an associated quantification coefficient, the method comprising the steps of:
   A. determining for each digital word in the sequence whether dividing the digital word by the associated quantification coefficient would result in a quantized word having a value exceeding the maximum value; and
   B. producing the quantized output word sequence by dividing each word by the quantization coefficient when it is determined that dividing each of the digital words in the received sequence by the quantification coefficient would not result in a quantized word having a value exceeding the maximum value, and by dividing each word by a larger division coefficient when it is determined that dividing each of the digital words in the received sequence by the quantification coefficient would result in a quantized word having a value exceeding the maximum value.

28. The method of claim 27, further including a step of, prior to step A, multiplying each digital word in the received sequence by a multiplication constant that is equal to a predetermined value when the received sequence represents a video signal for which no weighing coefficient is provided, and that is equal to the predetermined value divided by a weighing coefficient when the received sequence represents a video signal for which the weighing coefficient is provided.

29. The method of claim 27, wherein step A further includes steps of:
   determining a largest ratio of each of the digital words in the received sequence divided by a limit value determined based upon the maximum value; and
   comparing the largest ratio with the quantification coefficient associated with the received sequence, to determine whether dividing any of the digital words in the received sequence by the associated quantification coefficient would result in a quantized word having a value exceeding the maximum value.

30. The method of claim 29, wherein the step of determining a largest ratio further includes steps of:
   determining an absolute value for each digital word in the received sequence;
   dividing each absolute value by a division constant to generate a ratio for each digital word; and
   selecting a maximum among the ratios.

31. A system for processing data corresponding to pictures squares of a motion picture, comprising:
   a discrete cosine transform circuit that generates matrices of signed coefficients, having an input that receives the data corresponding to picture squares, and an output that provides a first sequence of digital words that represents the matrices of signed coefficients;
   a table, coupled to the output of the discrete cosine transform circuit, that provides a quantification coefficient associated with the first sequence of digital words;
   a quantizer, coupled to the discrete cosine transform circuit and the table, that generates a quantized sequence of digital words, the quantizer including;
   a storage element having an output and an input that receives the first sequence of digital words;
   a coefficient generating circuit having a first input that receives the first sequence of digital words, a second input that receives the quantification coefficient associated with the first sequence of digital words, and an output that provides the division coefficient, the coefficient generating circuit generating the division coefficient to be the larger of:
   the quantification coefficient associated with the first sequence of digital words; and
   a largest of the values of the digital words in the first sequence divided by a division constant that represents a maximum desired value for an output of the quantizer; and
   a divider having a dividend input coupled to the output of the storage element, a divisor input coupled to the output of the coefficient generating circuit, and an output that provides the quantized output word sequence.

32. The system of claim 31, further including a scanning and coding circuit, coupled to the output of the quantizer, that generates zigzag scanning, run/level coding, and variable length coding for the quantized sequence.

33. The system of claim 31, wherein the quantizer further includes a multiplier circuit having an input that receives the first sequence and an output that provides the first sequence to the input of the storage element and the input of the coefficient generating circuit, the multiplier multiplying each of the digital words of the first sequence by a multiplication constant.

34. The system of claim 31, wherein the multiplication constant is equal to a predetermined value when the first sequence represent a video signal for which no weighing coefficient is provided, and wherein the multiplication constant is equal to the predetermined value divided by a weighing coefficient when the first sequence represents a video signal for which the weighing coefficient is provided.

35. The system of claim 31, wherein the first sequence includes a plurality of subsequences of digital words, and wherein the quantizer further includes:

a maximum value circuit having an input that receives the first sequence and an output that provides for each of the plurality of subsequences a maximum value of the digital words in the subsequence; and a null circuit having an input coupled to the output of the maximum value circuit, and an output indicating for each of the plurality of sequences whether the maximum value of the digital words in the subsequence is lower than the calculated coefficient for the first sequence that includes the subsequence.

36. The system of claim 31, wherein the coefficient generating circuit further includes:

a saturation risk circuit having an input that receives the first sequence, and an output that is equal to a largest of ratios of each of the digital words in the first sequence divided by a limit value representing a maximum value desired to be provided by the quantizer;

a comparator having a first input coupled to the output of the saturation risk circuit, a second input that receives the quantification coefficient associated with the first sequence, and an output that is asserted when the output of the saturation risk circuit is greater than the quantification coefficient associated with the first sequence; and a switch having a selection input coupled to the output of the comparator, a first data input coupled to the output of the saturation risk circuit, a second data input that receives the quantification coefficient associated with the first sequence, and an output coupled to the divisor input of the first divider, the switch selecting the output of the saturation risk circuit when the selection input of the switch is not asserted, and the quantification coefficient associated with the first sequence when the selection input of the switch is asserted.

37. The system of claim 36, wherein the saturation risk circuit further includes:

an absolute value circuit having an input that receives the first sequence, and an output that provides an absolute value of each digital word in the first sequence;

a second divider having a dividend input coupled to the output of the absolute value circuit, a divisor input coupled to a division constant, and an output that provides, for each digital word in the first sequence, a ratio equal to the absolute value of the digital word divided by a division constant; and a maximum value circuit having an input coupled to the output of the second divider and an output indicative of a maximum ratio received from the second divider.

38. The system of claim 31, wherein the quantizer further includes an output saturation circuit having an input coupled to the output of the divider and an output that limits the quantized output word sequence to a maximum output value.

39. The system of claim 32, wherein the scanning and coding circuit provides a header as an output, and wherein the scanning and coding circuit provides as the header the calculated coefficient.

40. A system for processing data corresponding to pictures squares of a motion picture, comprising:

a discrete cosine transform circuit that generates matrices of signed coefficients, having an input that receives the data corresponding to picture squares, and an output that provides a first sequence of digital words that represents the matrices of signed coefficients;

a table, coupled to the output of the discrete cosine transform circuit, that generates a quantification coefficient associated with the first sequence of digital words;

a quantizer, coupled to the discrete cosine transform circuit and the table, that generates a quantized sequence of digital words, the quantizer including;

a storage element having an output and an input that receives the first sequence of digital words;

means for generating the division coefficient to equal the larger of:

a largest of the absolute values of the digital words of the first sequence of digital words divided by a division constant; and the quantification coefficient associated with the first sequence of digital words; and a divider having a dividend input coupled to the output of the storage element, a divisor input that receives the division coefficient from the means for generating, and an output that provides the quantized output word sequence.

41. The system of claim 40, further comprising a scanning/coding circuit, coupled to the output of the quantizer, that generates zigzag scanning, run/level coding, and variable length coding for the quantized sequence.

42. The system of claim 40, wherein the quantizer further includes a multiplier circuit having an input that receives the first sequence from the discrete cosine transform circuit and an output that provides the first sequence to the input of the storage element and the input of the coefficient generating circuit, the multiplier multiplying each of the digital words of the first sequence by a multiplication constant.

43. The system of claim 42, wherein the multiplication constant is equal to a predetermined value when the first sequence represents a video signal for which no weighing coefficient is provided, and wherein the multiplication constant is equal to the predetermined value divided by a weighing coefficient when the first sequence represents a video signal for which the weighing coefficient is provided.

44. The system of claim 40, wherein the first sequence of digital words includes a plurality of subsequences of digital words, and wherein the quantizer further includes:

a maximum value circuit having an input that receives the first sequence and an output that provides for each of the plurality of subsequences a maximum value of the digital words in the subsequence; and a null circuit having an input coupled to the output of the maximum value circuit, and an output indicating for each of the plurality of subsequences that the maximum value of the digital words in the subsequence is lower than the calculated coefficient for the first sequence that includes the subsequence.

45. The system of claim 40, wherein the quantizer further includes an output saturation circuit having an input coupled to the output of the divider and an output that limits the quantized output word sequence to a maximum output value.

46. The system of claim 41, wherein the scanning/coding circuit provides a header as an output, and wherein the scanning/coding circuit provides as the header the division coefficient.

* * * * *